United States Patent [19]

Mueller

[11] Patent Number: 4,891,253
[45] Date of Patent: Jan. 2, 1990

[54] MOISTURE BARRIER MEDICAL FILM

[75] Inventor: Walter B. Mueller, Inman, S.C.

[73] Assignee: W. R. Grace & Co.-Conn., Duncan, S.C.

[21] Appl. No.: 273,386

[22] Filed: Nov. 17, 1988

[51] Int. Cl.⁴ .............................................. B29D 22/00
[52] U.S. Cl. ................................. 428/35.2; 428/483; 428/516; 428/349
[58] Field of Search ...................... 428/349, 516, 35.2

[56] References Cited

U.S. PATENT DOCUMENTS

| | | | |
|---|---|---|---|
| 4,401,536 | 8/1983 | Lundell et al. | 204/159 |
| 4,643,926 | 2/1987 | Mueller | 428/35 |
| 4,720,427 | 1/1988 | Clauson et al. | 428/520 |
| 4,749,616 | 6/1988 | Liu et al. | 428/520 |
| 4,788,105 | 11/1988 | Mueller et al. | 428/518 |

*Primary Examiner*—Edith Buffalow
*Attorney, Agent, or Firm*—John J. Toney; William D. Lee, Jr.; Mark B. Quatt

[57] ABSTRACT

A flexible film suitable for medical solution pouches and parenteral materials generally includes a core layer of high density polyethylene, two intermediate layers comprising very low density polyethylene, an outer layer comprising an ethylene propylene copolymer or flexible copolyester, a sealant layer comprising a heat sealable polymeric material such as modified ethylene propylene copolymer, and two polymeric adhesive layers bonding the intermediate layers to the outer and sealant layers respectively.

11 Claims, 1 Drawing Sheet

MOISTURE BARRIER MEDICAL FILM

This invention relates to autoclavable flexible films suitable for the packaging of medical solutions.

Currently, it is common medical practice to supply liquids such as medical solutions for parenteral administration in the form of disposable, flexible pouches. These pouches should be characterized by collapsibility, transparency, and adequate mechanical strength. They must also be able to resist the relatively high temperatures required for heat sterilization of their contents, for example in an autoclave. Typically, medical solutions and the like are autoclaved at about 253° F. for periods of 15 to 30 minutes.

Presently, such flexible pouches are typically made from a highly plasticized polyvinyl chloride. While meeting the requirements mentioned above, polyvinyl chloride may have some undesirable properties for use as a medical solution pouch because of the possibility of migration of plasticizer from the polyvinyl chloride into the medical solution or the other contents of the pouch so that the solution may become contaminated by potentially toxic material. A question has also arisen concerning whether PVC is adequately chemically neutral to medical solutions. It has also been found that polyvinyl chloride becomes brittle at relatively low temperatures.

Embrittlement and stress-cracking, particularly of the outer surface of medical pouches, has been found to occur in other non-PVC pouches. It is desirable to provide a pouch for the packaging of medical solutions which substantially reduces or eliminates stress-cracking and embrittlement of the pouch material.

Of interest is U.S. Pat. No. 4,401,536 issued to Lundell et al which discloses the use of a blend of medical grade radiation-stabilized polypropylene and a copolymer of ethylene and a comonomer selected from the group consisting of vinyl esters of saturated carboxylic acids and alkyl esters of alpha, beta ethylenically unsaturated carboxylic acids, the blend being irradiated.

Also of interest is U.S. Pat. No. 4,643,926 issued to Mueller which discloses a flexible film for medical solution pouches generally including a sealant layer of ethylene propylene copolymer, modified ethylene propylene copolymer, or flexible copolyester; one or more interior layers including elastomeric polymeric materials such as very low density polyethylene; and an outer layer of ethylene propylene copolymer or a flexible copolyester.

OBJECTS

It is an object of the present invention to provide a film suitable for the packaging of medical solutions, the film having good flexibility.

Another object of the present invention is to provide a film suitable for the packaging of medical solutions characterized by good optical properties and a low degree of haze after autoclaving of the package.

Still another object of the present invention is to provide a film suitable for the packaging of medical solutions characterized by high mechanical strength.

An additional object of the present invention is to provide a film suitable for the packaging of medical solutions characterized by sufficient barrier properties, and especially improved moisture barrier properties to eliminate or reduce the need for separate overwrap material to insure that the concentration of the medical solution in the pouch is not adversely effected.

DEFINITIONS

The terms "flexible" and the like and "elastomeric" and the like are used herein to define specific polymeric materials as well as characteristics of a resulting pouch or bag whereby improved flexibility and/or collapsibility of the pouch or bag is obtained by the use of these specific polymeric materials. Flexible materials may be characterized by a modulus of preferably less than 50,000 PSI (ASTM D-882-81) and more preferably less than 40,000 PSI (ASTM D-882-81).

The term "film" and the like refers to a thermoplastic material suitable for packaging and having one or more layers of polymeric materials which may be bonded by any suitable means well known in the art.

The term "polymer", "polymeric", and the like, unless specifically defined or otherwise limited, generally includes homopolymers, copolymers and terpolymers and blends and modifications thereof.

The term "interior" and the like is used herein to refer to a layer of a multilayer film which is not a skin or surface layer, or sealant layer, of the film.

The term "melt flow" and "melt flow index" is used herein as the amount, in grams, of a thermoplastic resin which can be forced through a given orifice under a specified pressure and temperature within 10 minutes. The value should be determined in accordance with ASTM D 1238-79.

The term "very low density polyethylene" (VLDPE) is used herein to define a copolymer of ethylene and alpha-olefin with densities below about 0.915 gm/cc, preferably between 0.890 to 0.912 g/cc. and including densities as low as 0.860 gm/cc, as measured by ASTM D-1505.

The term "ethylene vinyl acetate copolymer" (EVA) is used herein to refer to a copolymer formed from ethylene and vinyl acetate monomers wherein the ethylene derived units in the copolymer are present in major amounts and the vinyl acetate derived units in the copolymer are present in minor amounts.

The term "ethylene propylene copolymer" is used herein to refer to a copolymer formed from polypropylene monomer and minor amounts, usually less than 6%, of ethylene.

The term "copolyester" and the like is applied to polyesters synthesized from more than one diol and a dibasic acid. Copolyesters as used herein may also be characterized as copolymers of polyether and polyethylene terephthalate. More preferably copolyesters as used herein may be characterized as polymeric materials derived from 1,4 cyclohexane dimethanol, 1,4 cyclohexane dicarboxylic acid, and polytetramethylene glycol ether, or equivalents of any of the above, as reactants.

The term "modified" and the like is used herein to refer to a polymeric material in which some or all of the substituents are replaced by other materials, providing a change in properties such as improved flexibility or elastomeric properties. In the case of modified ethylene propylene copolymer, the modification is provided by a rubbery block copolymer such as commercially available under the trade-mark Kraton from the Shell Chemical Company.

The term "high density polyethylene" is used herein to refer to a polyethylene having a density of about 0.935 grams per cubic centimeter or higher. This material sometimes actually constitutes a copolymer of ethylene with an alpha-olefin of 4 to 8 carbons, such as butene or hexene. These latter materials are linear in molecular arrangement.

SUMMARY OF THE INVENTION

A flexible film in accordance with the invention comprises a core layer of high density polyethylene; two intermediate layers, each layer bonded to a respective surface of the core layer, and comprising very low density polyethylene; an outer layer comprising an ethylene propylene copolymer or flexible copolyester; a sealant layer comprising a heat sealable polymeric material; and two polymeric adhesive layers, each layer disposed between and bonding an intermediate layer to the outer and sealant layers respectively.

DETAILED DESCRIPTION OF THE PREFERRED EMBODIMENTS

Figure 1:
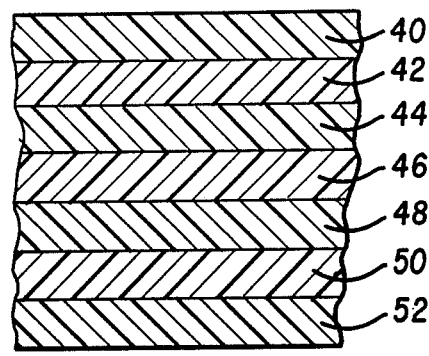
FIG. 1 is a schematic cross-section of a film made in accordance with the invention.

FIG. 1 shows a seven layer flexible laminate in accordance with the present invention. Sealant layer 40 preferably comprises an ethylene propylene copolymer (EPC). The sealant layer may also comprise a modified ethylene propylene copolymer. A suitable EPC is Eltex KS 409X6206 available from Solvay. This copolymer has an ethylene content of about 3.8%. A suitable modified EPC is Cosden Z4650 available from Cosden Chemical Company. Polyallomers may also be used, such as ethylene propylene block copolymer, available from Eastman as M7853-368A, having a melt flow index of about 12. The sealing layer will be in contact with the medical solution or other material to be contained within flexible bags or pouches made from the flexible films of the present invention.

Adhesive layer 42 is preferably made from a blend of modified ethylene propylene copolymer and very low density polyethylene. A suitable blend is for example a blend of 50% of the modified ethylene propylene copolymer (such as the Cosden Z4650 material) and 50% of the very low density polyethylene (an especially suitable commercial resin is DEFD 1137 available from Dow Chemical Company). Other polymeric materials or blends of polymeric materials may also be used for interior layer 42 to the extent that the moisture barrier, flexibility and other essential characteristics of the film material are not substantially affected, and provided of course that sufficient adhesion is provided between intermediate layer 44 and sealant layer 40.

Intermediate layer 44 is preferably a very low density polyethylene such as the VLDPE resin, DEFD 1137, described above. This particular resin has a density of about 0.906 grams per cubic centimeter and a melt flow index of about 0.8 grams per 10 minutes.

Intermediate layer 48 may be the same VLDPE as in layer 46, or a different VLDPE material.

Core layer 46 is preferably a high density polyethylene. A preferred commercial resin is Norchem 5102. High density polyethylene (HDPE) is considered to be a polyethylene having a density of about 0.935 grams per cubic centimeter or higher. Occasionally, polyethylenes with some comonomer content, and having a density of between about 0.941 and 0.959 grams per cubic centimeter may be classified as high densitiy polyethylene. The Norchem resin has a density of about 0.947 grams per cubic centimeter.

Outer layer 52 is preferably ethylene propylene copolymer or a flexible copolyester. More preferably, a copolymer of polyether and polyethylene terephthalate, such as Eastman PCCE 9965 from Eastman Chemical Products, Inc. in used for outer layer 52. Other suitable flexible copolyesters are PCCE 9966 and PCCE 9967 all available from Eastman. These particular copolyesters are characterized by inherent viscosities ranging from 1.05 to 1.28, and by the use of 1,4 cyclohexanone dimethanol, 1,4 cyclohexane dicarboxylic acid, and polytetramethylene glycol ether as reactants in producing the flexible copolyester resins.

Various polymeric materials or blends of materials may be used for adhesive layer 50 provided that the material used imparts sufficient adhesion between outer layer 52 and intermediate layer 48. When a flexible copolyester is used for outer layer 52, the preferred material for layer 50 is a modified ethylene methyl acrylate copolymer with a carboxylic acid or acid anhydride functionality. An especially preferred commercial resin is Plexar 3382 available from du Pont.

Another suitable commercial resin is CXA E162 available from du Pont.

The films as described are preferably manufactured by a cast coextrusion process.

EXAMPLES

Exemplary multi-layer structures were cast coextruded and irradiated. These structures are viewed as potential replacements for polyvinyl chloride bags. The critical parameter which was measured was the moisture barrier property. Examples 1 through 10, in part reflected in the detailed description of the preferred embodiments hereinbefore described, are listed below with their respective formulations, beginning with the outside layer and ending with the inside or sealant layer. Unless otherwise denoted, Examples 1–10 included the following materials:

EPC: Eltex KS409x6206;
modified EPC: Z4650;
flexible copolyester: PCCE 9965;
HDPE: Norchem 5102
VLDPE: DFDA 1137;
and
modified EVA: CXA-E162.

In Example 1, the multilayer film comprised modified EPC/50% modified EPC+50% VLDPE/VLDPE/HDPE/VLDPE/Modified EVA/Flexible Copolyester. The film has a thickness of 11.0 mils.

In Example 2, the multi-layer film comprised the same construction as the film of Example 1. The film of Example 2 was autoclaved.

In Example 3, the multi-layer film comprised Modified EPC/50% Modified EPC+50% VLDPE/VLDPE/Modified EVA/Flexible Copolyester. The film of Example 3 had a thickness of about 7.5 mils.

In Example 4, the multi-layer film comprised the same construction as Example 3. The film of Example 4 was autoclaved.

In Example 5, the multi-layer film comprised the same construction as Examples 3 and 4, but made with a pinch roll speed of 36 feet per minute instead of the higher speed of 52 feet per minute of the film of Examples 3 and 4. This resulted in a film having a thickness of about 11 mils.

In Example 6, the multi-layer film comprised the same construction and same film thickness as the film of Example 5. The film of Example 6 was autoclaved.

In Example 7, the multi-layer film comprised the same construction as the films of Examples 3 through 6, but made at a nip roll speed of 30.5 feet per minute. A tubing having a thickness of about 13 mils resulted.

In Example 8 a multilayer film comprised the same construction and film thickness as the film of Example 7. The film of Example 8 was autoclaved.

In Example 9, the multi-layer film comprised the same construction as the films of Examples 3 through 8, but produced at a pinch roll speed of 26 feet per minute to make a 15 mil tubing.

In Example 10, the multi-layer film comprised a structure identical to that of Example 9 but subsequently autoclaved.

Tables 1 through 3 demonstrate the results of physical testing of Examples 1 through 10 for moisture vapor transmission rate (MVTR).

TABLE 1

| Water Vapor Transmission at 100° F.[1] | Example 1 | Example 2 | Example 3 | Example 4 |
|---|---|---|---|---|
| Sample 1 | 0.13 | 0.14 | 0.30 | 0.30 |
| Sample 2 | 0.13 | 0.15 | 0.28 | 0.30 |
| Sample 3 | 0.12 | 0.13 | 0.30 | 0.31 |
| Gauge[2] | | | | |
| Sample 1 | 11.66 | 12.20 | 7.69 | 8.03 |
| Sample 2 | 12.31 | 11.29 | 7.62 | 8.00 |
| Sample 3 | 12.40 | 11.71 | 7.81 | 7.98 |

TABLE 2

| Water Vapor Transmission at 100° F.[1] | Example 5 | Example 6 | Example 7 |
|---|---|---|---|
| Sample 1 | 0.19 | 0.19 | 0.17 |
| Sample 2 | 0.19 | 0.19 | 0.19 |
| Sample 3 | 0.19 | 0.16 | 0.17 |
| Gauge[2] | | | |
| Sample 1 | 11.17 | 12.31 | 13.07 |
| Sample 2 | 11.08 | 12.23 | 12.84 |
| Sample 3 | 11.14 | 12.40 | 12.93 |

TABLE 3

| Water Vapor Transmission at 100° F.[1] | Example 8 | Example 9 | Example 10 |
|---|---|---|---|
| Sample 1 | 0.17 | 0.15 | 0.15 |
| Sample 2 | 0.20 | 0.16 | 0.15 |
| Sample 3 | 0.18 | 0.18 | 0.15 |
| Gauge[2] | | | |
| Sample 1 | 13.82 | 14.81 | 15.72 |
| Sample 2 | 11.96 | 15.00 | 16.00 |
| Sample 3 | 12.79 | 16.07 | 16.04 |

The following footnotes applies to Tables 1 through 3.
[1] ASTM F372.
[2] Gauge measured in mils. Values listed are for corresponding samples.

Films in accordance with the present invention are preferably cross-linked. This is preferably done by irradiation, i.e. bombarding the film with particulate and non-particulate radiations such as high energy electrons from an accelerator or cobalt-60 gamma rays, to cross-link the materials of the film. Cross-linking increases the structural strength of film and/or the force at which the material can be stretched before tearing apart, and may also improve the optical properties of the film and change the high temperature properties of the film. A preferred irradiation dosage level is in the range of from about 2 Megarads (M.R.) to about 5 M.R. In the case of films having a copolyester, lower dosages of irradiatiion may be required to keep extractables at a tolerable level.

Cross-linking may also be accomplished chemically by the use of peroxides.

Pouches made in accordance with the present invention may be heat sealed by various means well known in the art. Impulse and hot bar sealing are preferred means. Some structures having a relatively thick layer of EVA may be sealed by radio-frequency sealing.

The films according to the present invention are preferably formed by cast coextrusion. A hot blown process may also be employed, although optical properties of the resulting pouch would be inferior to those from a cast coextrusion process.

An important property of a flexible medical solution bag is the moisture vapor transmission rate. Typically, the concentrations of the medical solutions inside the pouch must be carefully maintained. Pouches or bags currently made from PVC require moisture barrier materials in an overwrap arrangement i.e. a separate overwrap material, to insure that the concentration of solutions obtained in the pouch is not affected.

In order to guarantee a product shelf life of about two years, a moisture transmission rate of about 0.2 grams per 100 square inches, in 24 hours at 100° F. at 100% relative humidity, or less, is generally recognized as being required.

The current medical film sold by W. R. Grace & Co.-Conn. through its Cryovac Division has a moisture vapor transmission rate of about 0.3 grams per 100 square inches in 24 hours, at 100° F. and 100% relative humidity.

The film of the present invention, as exemplified in Examples 1 and 2 above, exhibits a moisture vapor transmission rate well under 0.2, and in some cases approaching 0.1 grams per 100 square inches. A pouch made for example according to Example 1 of the present invention, when incorporated in a large (greater than 1 liter) solution bag, has superior barrier properties such that additional overwrap would not be required in order to maintain concentration of the solution. Similarly, Example 2 showed excellent values for moisture vapor transmission rate. These would, therefore, be preferred examples for producing a pouch for medical solutions such as intravenous solutions without the need for separate overwrap material to maintain the concentration of the solution.

These results are all the more remarkable because flexible copolyester, while providing the low modulus values useful in the packaging of medical solutions, has very high moisture permeability.

The very high moisture permeability of the flexible copolyesters, however, is itself an advantage during autoclaving of solution containing pouches. For example, in parenteral solution pouches where polypropylene forms an outside layer and an interior layer contains EVA water is absorbed through the polypropylene layer into the EVA layer during autoclaving of the pouch or bag. After autoclaving is completed, the absorbed water does not completely remove from the material, thereby leaving a very hazy or cloudy bag structure. Optics are critical in the field of parenteral bags or pouches in order to insure that the medical solution contains no foreign contaminants.

It has been found that by using a flexible copolyester, water absorbed by an interior layer such as ethylene vinyl acetate copolymer during autoclaving can subsequently escape out through the copolyester outer layer. This allows the optical properties of the flexible pouch to be maintained. These particular structures would therefore be especially useful in applications where optical quality is a critical parameter for the solution containing bag or pouch.

The use of VLDPE in combination with an outside layer of a flexible copolyester allows the influx of moisture during elevated autoclaving temperatures, i.e. around 230° F. At these high temperatures, the barrier properties of VLDPE are greatly reduced. After autoclaving and during cooling, the absorbed moisture in the interior layer or layers of the pouch is allowed to escape through the flexible copolyester. At the same time, the barrier properties of the VLDPE interior layer are restored. In this fashion, the concentration of the medical solution is maintained while eliminating absorbed moisture from the interior layers of the pouch, thereby reducing haze.

Because of the good moisture barrier properties of these films, they may eliminate the need in many cases for a separate overwrap material to maintain the concentration of the medical solution. Three commercially available overwraps of 6 mil, 4.5 mil, and 4.5 mil thickness, exhibited moisture vapor transmission rates ranging from 0.12 to 0.24 grams/(24 hours, 100 square inches) at 100° F. and 100% relative humidity. Examples 1 and 2 discussed above, compare favorably with these overwrap materials with respect to moisture vapor barrier properties.

The laminated films of the present invention also exhibit good seal strength, and abuse resistance, and do not substantially distort during autoclaving.

It should be noted that the detailed description and specific examples which indicate the presently preferred embodiments of the invention are given by way of illustration only. Various changes and modifications within the spirit and scope of the claims will become apparent to those of ordinary skill in the art upon review of the above detailed description and examples.

What is claimed is:

1. A flexible film comprising:
   (a) a core layer of high density polyethylene;
   (b) two intermediate layers, each layer bonded to a respective surface of the core layer, and comprising very low density polyethylene;
   (c) an outer layer comprising an ethylene propylene copolymer or flexible copolyester;
   (d) a sealant layer comprising a heat sealable polymeric material; and
   (e) two polymeric adhesive layers, each layer disposed between and bonding an intermediate layer to the outer and sealant layers respectively.

2. A flexible film according to claim 1 wherein the sealant layer comprises a polymeric material selected from the group consisting of ethylene propylene copolymer, modified ethylene propylene copolymer, and flexible copolyester.

3. A flexible film according to claim 1 wherein the adhesive layers each comprise an anhydride-modified polymeric adhesive.

4. A flexible film according to claim 3 wherein the adhesive layers each comprise an EVA-based, anhydride-modified polymeric adhesive.

5. A flexible film according to claim 3 wherein the adhesive layers each comprise an EMA-based, anhydride-modified polymeric adhesive.

6. A pouch made from the film of claim 1.
7. A pouch made from the film of claim 2.
8. A pouch made from the film of claim 3.
9. A pouch made from the film of claim 4.
10. A pouch made from the film of claim 5.
11. The flexible film of claim 1 wherein the film is cross-linked.

* * * * *